(12) United States Patent
Vovan

(10) Patent No.: US 8,071,925 B2
(45) Date of Patent: Dec. 6, 2011

(54) STEAM BOWL

(75) Inventor: Terry Vovan, Upland, CA (US)

(73) Assignee: PWP Industries, Vernon, CA (US)

( * ) Notice: Subject to any disclaimer, the term of this patent is extended or adjusted under 35 U.S.C. 154(b) by 1313 days.

(21) Appl. No.: 11/713,414

(22) Filed: Mar. 2, 2007

(65) Prior Publication Data

US 2008/0210101 A1 Sep. 4, 2008

(51) Int. Cl.
*H05B 6/80* (2006.01)
(52) U.S. Cl. ............................ 219/732; 219/731; 99/331
(58) Field of Classification Search .................. 219/732, 219/734, 725, 385; 99/331, 140, 339, 372, 99/337, 340, 323.3, 275; 126/246, 377.1, 126/369; 426/243, 523
See application file for complete search history.

(56) References Cited

U.S. PATENT DOCUMENTS

| | | | | |
|---|---|---|---|---|
| 3,508,485 A | * | 4/1970 | Munsey | 99/331 |
| 4,542,685 A | * | 9/1985 | Wilson | 99/413 |
| 5,558,798 A | | 9/1996 | Tsai | |

* cited by examiner

*Primary Examiner* — Quang Van
(74) *Attorney, Agent, or Firm* — Baker Botts, L.L.P.

(57) ABSTRACT

A bowl assembly (10) for steaming food as in a microwave oven, includes a bowl (12), a platform (14) that lies in the bowl for supporting food, and a lid (16) and lidding film (13) that close the bowl. The platform includes a plate (22) and one or more upstanding handles (46) that allow a person to lift or tilt the plate with food thereon even while the plate is hot. The bowl has a bottom wall (26) with a convexly curved upper surface (80), and with a middle that forms a recess (72) that receives a downwardly-protruding latch (70) of the plate to latch the plate to the bowl. The plate has a plurality of depressions that form liquid guiding channels (40) with holes (42) for draining liquids. The periphery of the plate is supported on an interrupted up-step (60) at the periphery of the bowl bottom wall, with gaps (18) left between the up-steps though which liquids can drain.

21 Claims, 13 Drawing Sheets

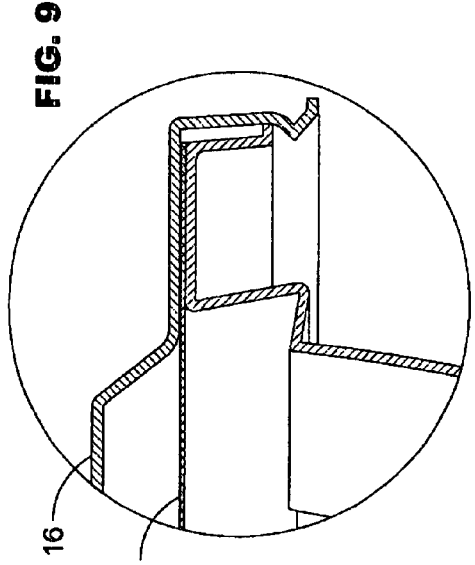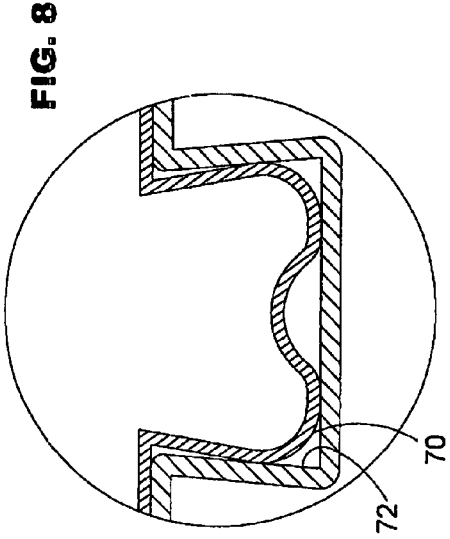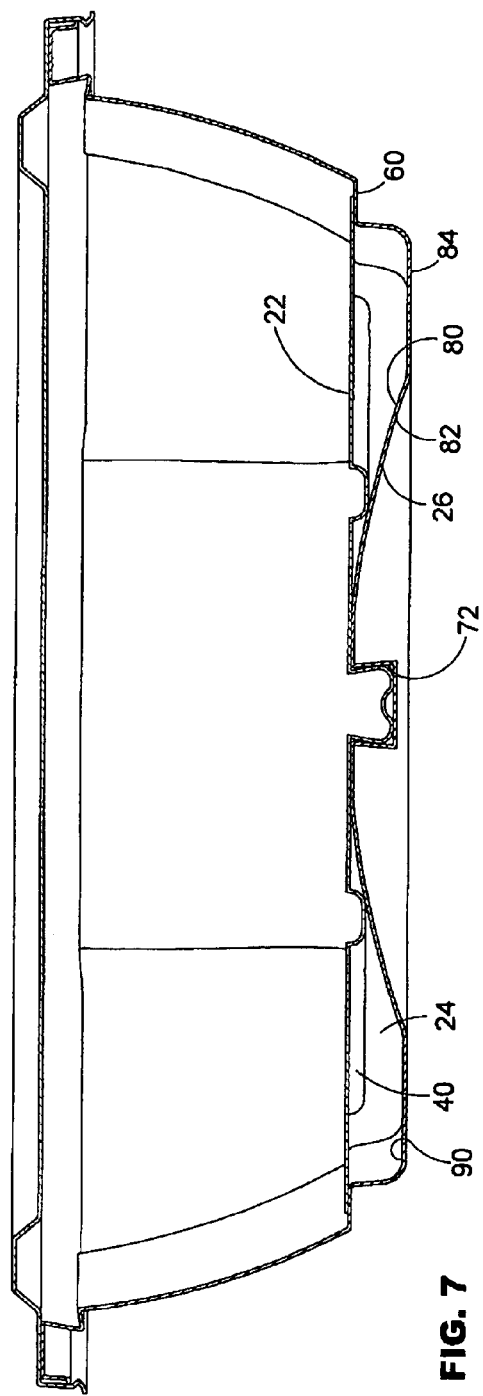

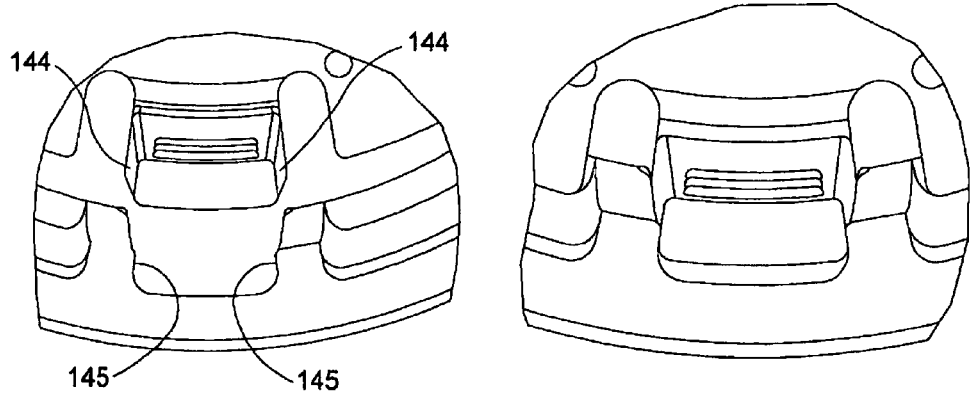
FIG. 16  FIG. 17
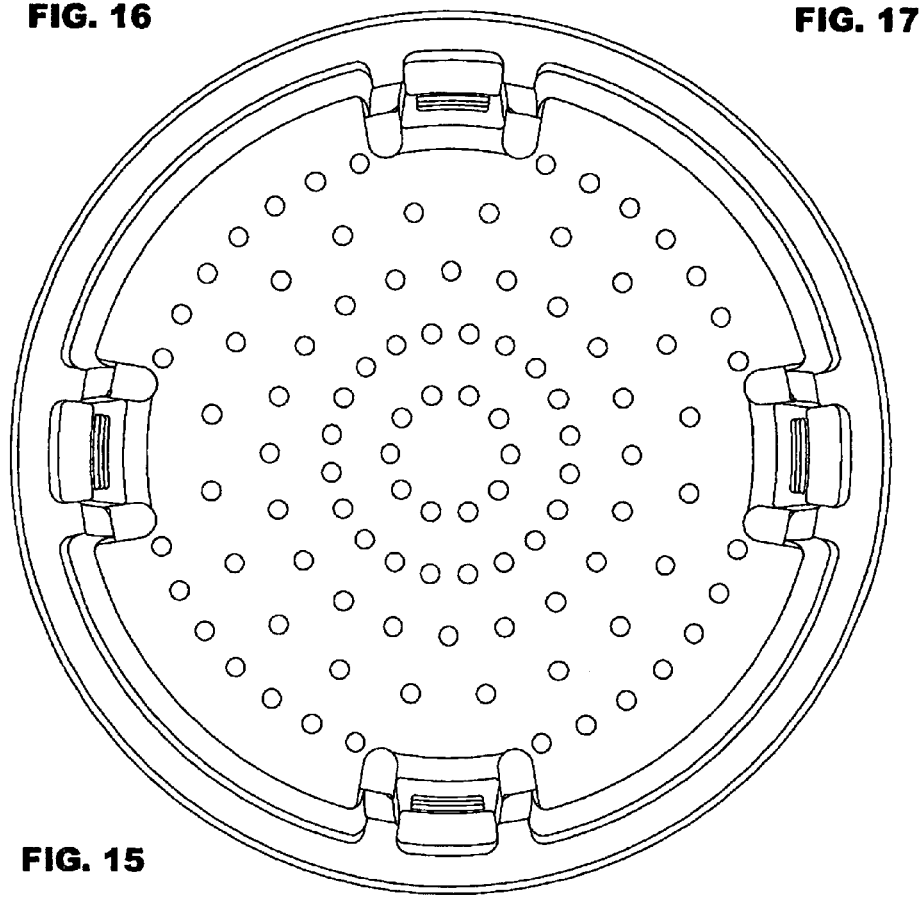
FIG. 15

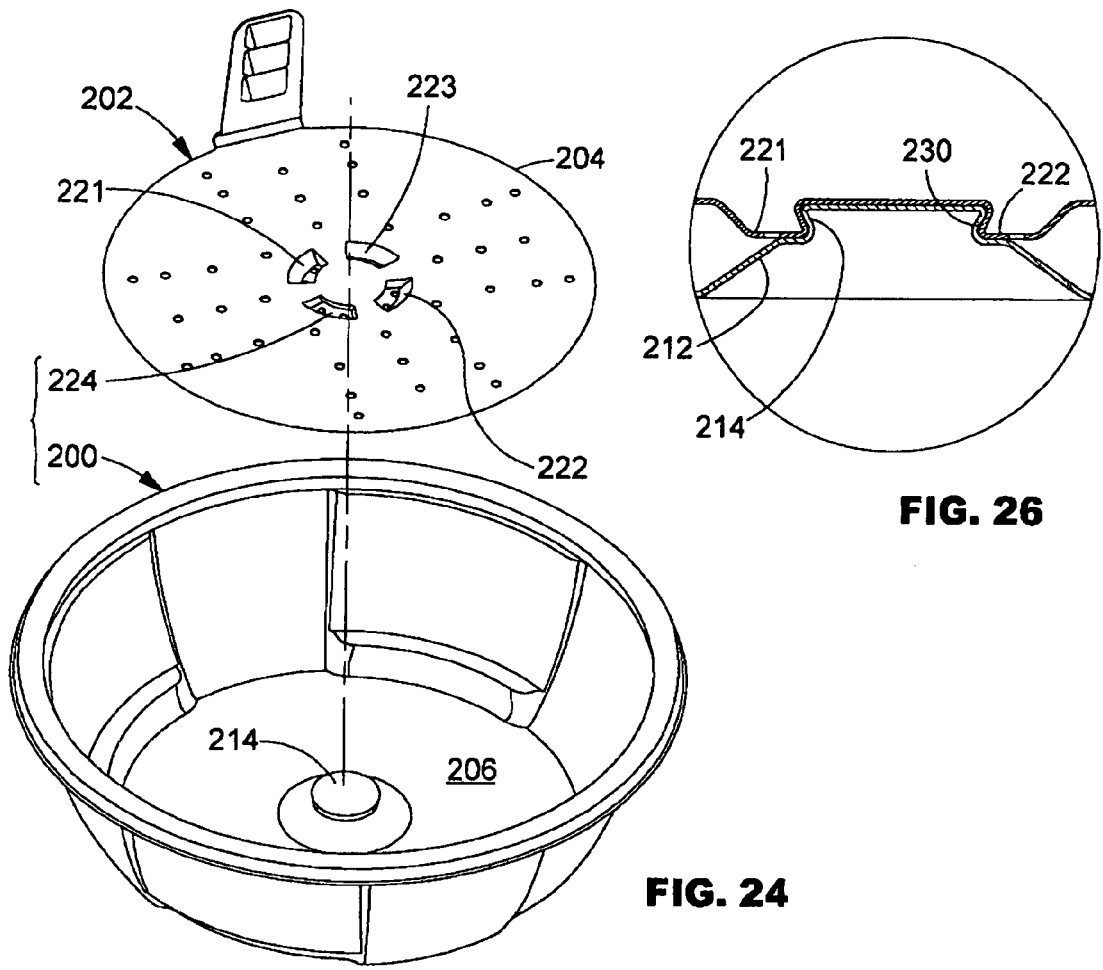
FIG. 24
FIG. 26
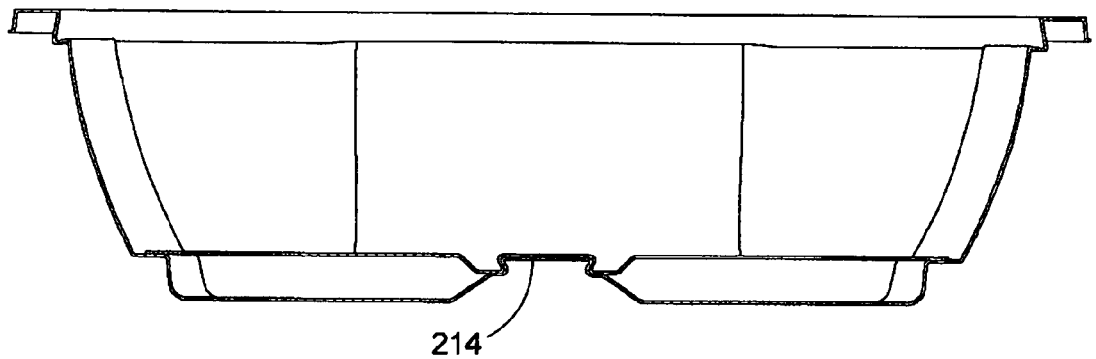
FIG. 25

US 8,071,925 B2

STEAM BOWL

BACKGROUND OF THE INVENTION

Many foods that are heated or cooked in a microwave oven, can be given an enhanced flavor by employing a steaming process. In the steaming process, food is supported on a platform lying a distance above the bottom of a bowl, while liquids that contain water, such as sauces, juices, etc. lie in the bottom of the bowl where water in the liquids produce steam and flavoring vapors that flow over the food on the platform. A lid is usually provided to close the top of the bowl and keep in steam.

The bowl, platform and lid are preferably each formed of a single sheet of deformed plastic. The bowl and platform should be formed to efficiently perform several functions required for good steaming. One function is allowing sauces, juices, and other water-bearing liquids to efficiently flow from food on the platform to the bottom of the bowl where the water evaporates for steaming. The platform must be supported a distance above the bottom of the bowl, and be latched so the platform position remains stable during cooking. The sauces, gravies, etc. should accumulate in a limited area of the bottom of the bowl so there is a thick pool of them that can be lifted by a spoon to spread them on food supported on the platform. A person should be able to easily lift the platform and tilt it even when the food is hot. A steam bowl assembly which performed the above functions and which could be produced at low cost, would be of value.

SUMMARY OF THE INVENTION

In accordance with one embodiment of the present invention, a bowl assembly is provided for steam cooking of food, which can be constructed at low cost and which efficiently performs several functions required for good steam cooking. The bowl assembly includes a bowl with an axis, and a platform that lies a distance above the bottom of the bowl and that supports food, the bowl, platform and a lid each usually being formed of a deformed sheet of plastic. The platform includes a plate and one or more handles extending up from the periphery of the plate. This facilitates a person tipping and/or lifting the plate even when the plate is hot and covered with liquids, and holds the weight of food.

The bottom wall of the bowl has an upper face that is convex. This concentrates fluids in a deeper pool at the periphery of the bowl bottom. This also raises the middle of the bowl bottom wall, where a latching recess is formed. The plate has a corresponding downwardly-projecting latch that fits into the recess to hold down the plate. The periphery of the plate is supported on an up-step formed at the periphery of the bowl bottom wall. There are gaps between parts of the up-step through which fluids can flow down into the bowl bottom.

The plate has channels formed by depressions that extend below the plate bottom face. The channels carry fluids and have holes though which the fluids drain. The depressions have radially outer ends that lie inward of the up-step.

The novel features of the invention are set forth with particularity in the appended claims. The invention will be best understood from the following description when read in conjunction with the accompanying drawings.

DESCRIPTION OF THE DRAWINGS

FIG. 7 is a sectional view taken on line 7-7 of FIG. 4, with the lid closed on the bowl.

FIG. 8 is an enlarged view of the latch portion of the assembly of FIG. 7.

FIG. 9 is an enlarged view of the lid-to bowl connection, with a vapor trapping film on the top of the bowl.

FIG. 15 is a plan view of the bowl assembly of FIG. 11.

FIG. 16 is a plan view of a portion of the bowl assembly of FIG. 15 with one of the platform handles deflected radially inward out of a notch in the periphery of the bowl.

FIG. 17 is a view similar to that of FIG. 16, with the handle released to move radially outward back into the notch.

FIG. 24 is an exploded isometric view of a bowl and platform of another embodiment of the invention, which has a modified latch arrangement to hold down the platform.

FIG. 25 is a sectional view of the assembled bowl and platform of FIG. 24.

FIG. 26 is an enlarged view of a portion of the view of FIG. 25.

DESCRIPTION OF THE PREFERRED EMBODIMENTS

Figure 1:
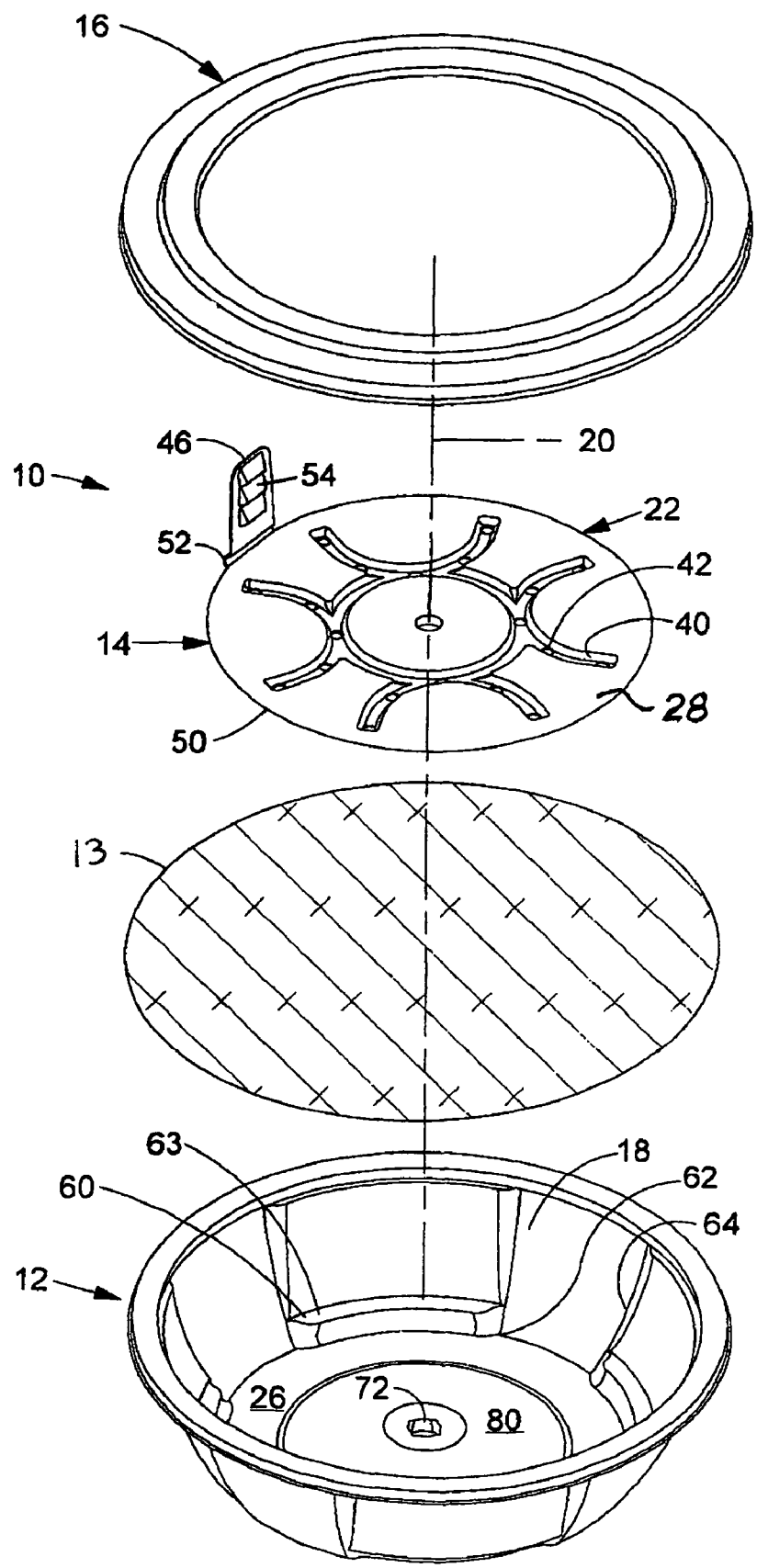
FIG. 1 is an exploded isometric view of a bowl assembly of the present invention, showing the bowl, platform, lid and lidding film thereof.
Figure 2:
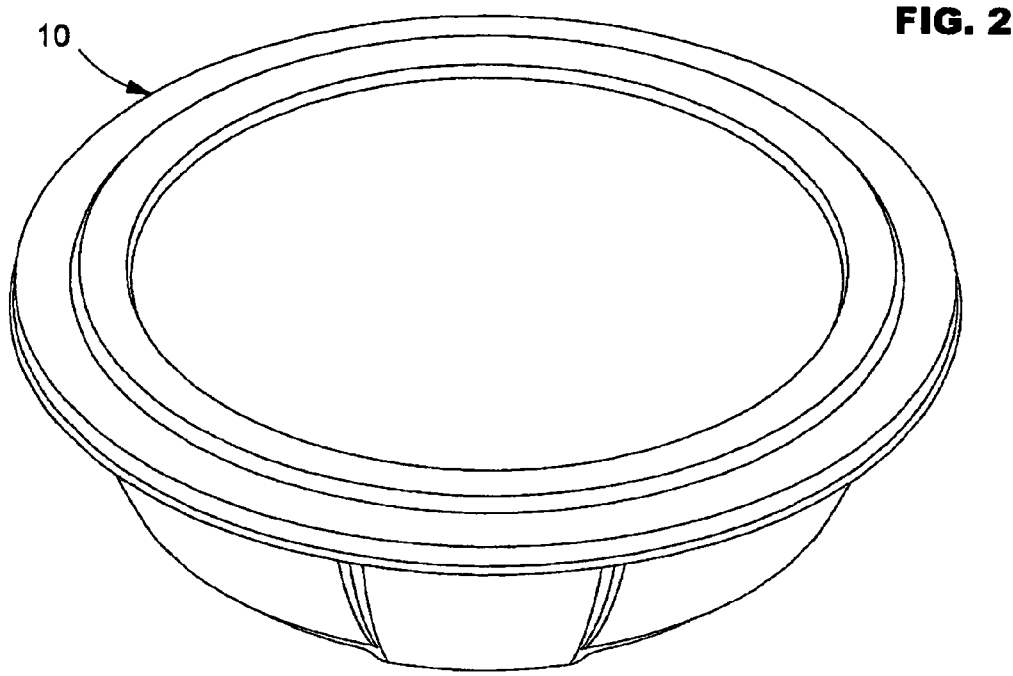
FIG. 2 is an isometric view of the bowl assembly of FIG. 1 in a fully closed position.
Figure 3:
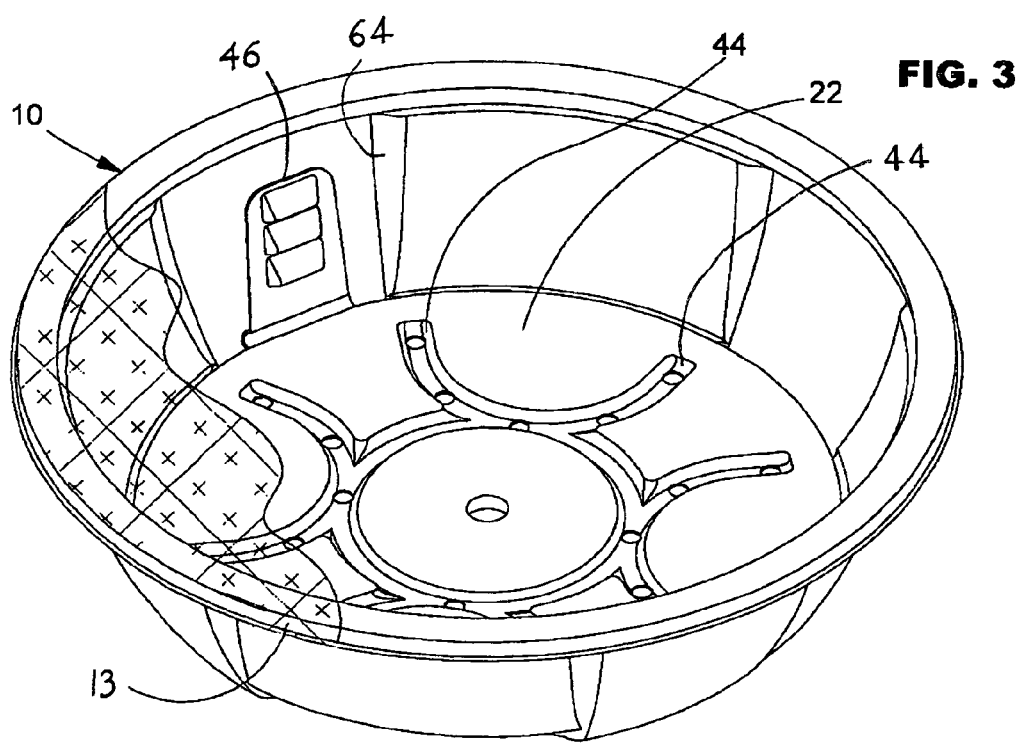
FIG. 3 is an isometric view of the assembled bowl and platform of FIG. 1, with most of the lidding film being cut away.
Figure 4:
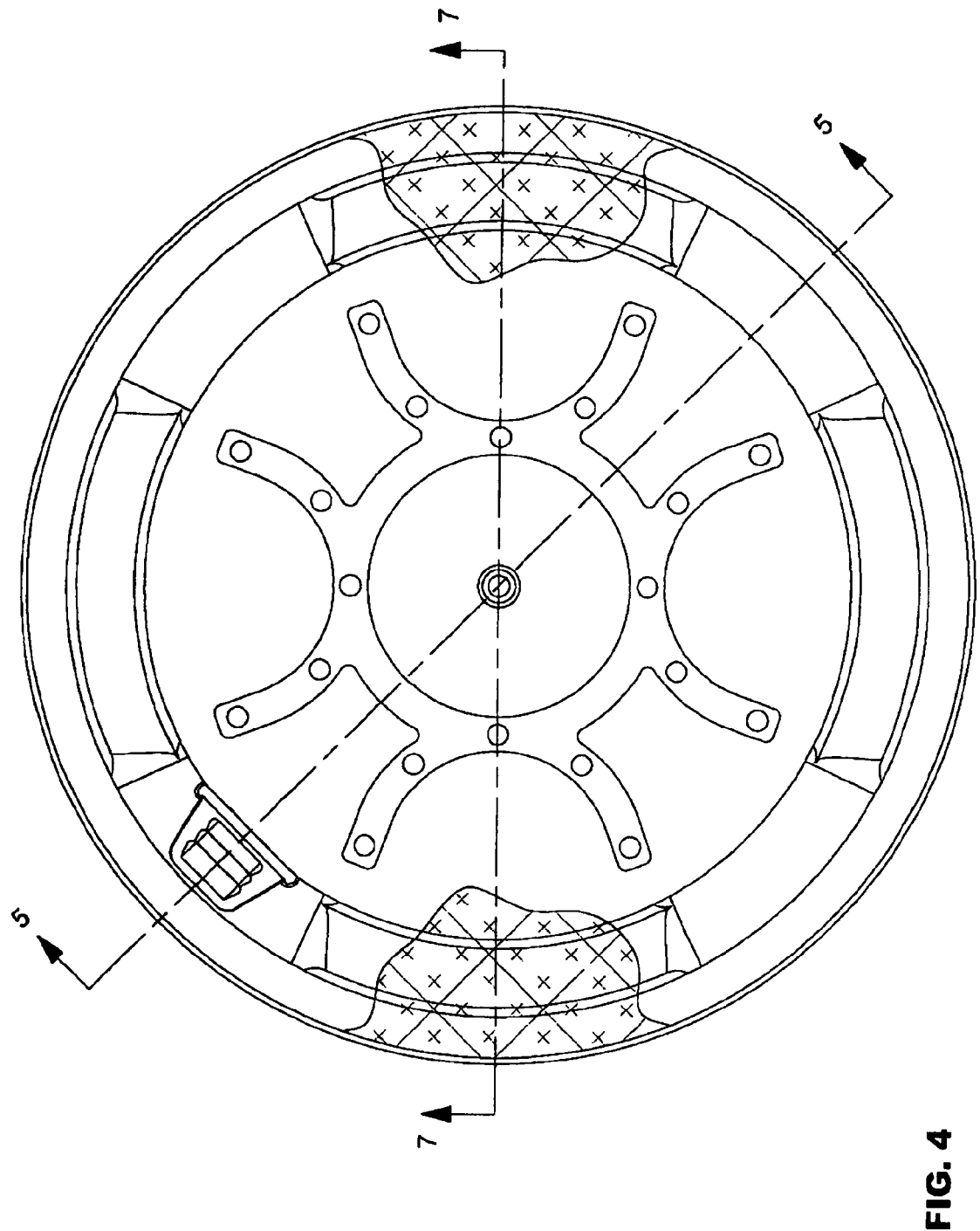
FIG. 4 is a plan view of the assembled bowl and platform of FIG. 3.

FIG. 1 illustrates a bowl, or container 10 of the present invention, which includes a container base 12 with a cavity for holding food, a platform 14 that fits into the base, and a lid 16 that covers the base. The base can be rounded as illustrated, or of another shape that forms a food-holding cavity. The three parts all lie on a vertical axis 20. A transparent or translucent lidding film 13 may be used that adheres to the rim of the bowl or base. The bowl has a bottom wall 26 and side walls 18 that extend primarily upward from the periphery of the bottom wall. The container is used by placing food that is to be steam-cooked on a food support surface 28 of a plate 22 of the installed platform, as shown in FIG. 3. A wide variety of food can be steam cooked, including vegetables, certain fruits, fish and meats. In many cases, sauces or other water-containing liquid is placed in a pool 24, shown in FIG. 5, that lies at a radially outer portion of the base bottom wall 26, before the platform is installed to lie spaced above most of the bottom wall. The lid 16 is then closed on the top of the base. The combination of the container with food therein, is then heated in a microwave oven. As the food and water-bearing liquids such as sauces, juices, etc. are heated, water in such liquids turns into steam that circulates though the base and the flavored stream (steam and flavored vapors) adds flavor to the food while cooking it. A small opening (not shown) can be provided as in the lid to allow excess steam to be released. The lid can be removed and the lidding film left, with one side of the film lifted, of holes punched in the film, to vent steam.

As food is heated, much of the liquids are released from the foods, and much of the liquids that were turned into steam condense in upper portions of the bowl and drop onto the plate 22 of the platform. Such fluids preferably flow down onto the bottom wall 26 of the bowl where the fluid is usually hottest, to evaporate and create more flavored steam for steam cooking.

Figure 6:
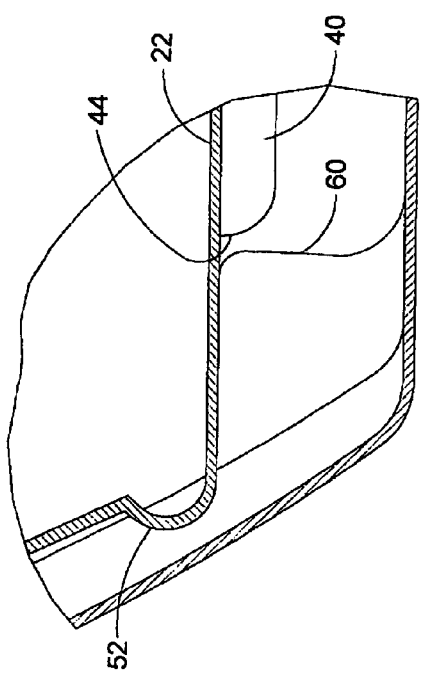
FIG. 6 is an enlarged view of the hinge of the platform of FIG. 5.

The bowl, platform, and lid are preferably each formed from a sheet of plastic, as by vacuum forming, which allows the container to be sold at low cost. FIG. 1 shows that the platform has elongated depressions or channels 40 in the food support surface 28, with holes 42 at the bottom. The channels and holes drain liquids such as those that have flowed out of heated food and those that have condensed onto the platform, towards radially outward (with respect to axis 20) portions of the base bottom wall at the pool 24, and allow steam to be more evenly directed onto the food. Even though the platform is formed of thin sheet plastic, the channels 40 are given substantial depth to avoid overflow, by deforming the bottom walls of the channels downwardly. FIG. 6 shows that radially outer ends 44 of the channels lie radially inward of an interrupted up-step 60 that supports the platform plate. Each channel end 44 forms a barrier to further horizontal flow of liquid along the channel.

In many cases, towards the end of a cooking, a cook wishes to open the container while it is still hot, and to lift or tilt the platform plate 22 and food thereon, as to dump the food from the plate onto the bowl bottom wall. To facilitate this, applicant provides an upstanding handle 46 (FIG. 1) at the periphery 50 of the platform, that is, at a location furthest from the bowl axis 20. The handle is joined by a curved hinge portion 52 to the plate to allow limited pivoting of the handle, and the handle has grooves 54 to facilitate a firm grip on it. FIG. 6 shows that the hinge portion 52 has a curve of about 135°. The handle is integral with the plate 22 and has a circumferential width that is a plurality of times greater than a radial thickness of the handle.

Figure 5:
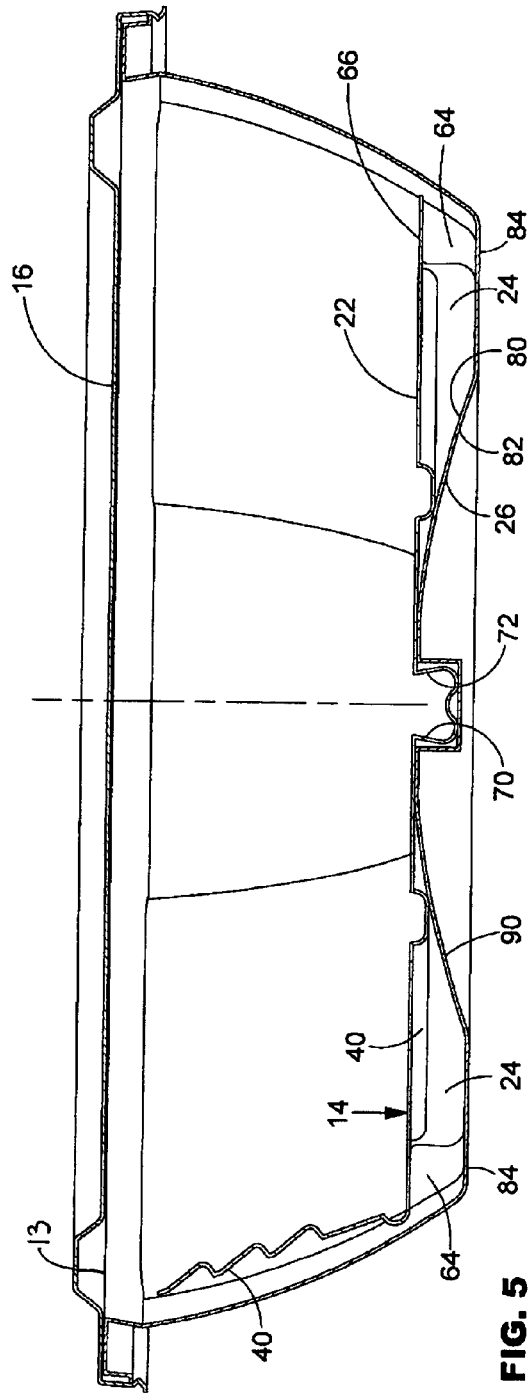
FIG. 5 is a sectional view taken on line 5-5 of FIG. 4, and with the lid closed on the bowl.

FIG. 1 shows that the bowl has an interrupted up-step 60 at the periphery 62 of its bottom wall 26. The up-step provides support for the plate 22 of the platform. The up-step has support parts 63 that are angularly spaced (with respect to axis 20) to leave gaps 64 though which fluids and steam (and flavored vapors) can flow upward and downward between food on the plate and the pool of liquid on the bowl bottom wall. The side walls of the up-steps have portions that extend above the support parts and that form upper portions of the gaps 64. FIG. 7 shows opposite sides of the plate 22 supported on the up-step 60 of the bowl bottom wall periphery. FIG. 5 shows opposite sides 66 of the plate 22 lying in the gaps 64 between up-step parts.

It is usually desirable to hold down the platform 14 so the plate 22 lies at a constant height above a flat portion 84 of the bottom of the bowl, while allowing easy lift-up of the platform when desired. Applicant accomplishes this with a mechanical lock achieved by forming the platform plate with a downwardly-protruding latch projection 70, and by forming the middle of the bowl bottom wall 26 with a recess 72 that receives the downward latch projection and latches to it. As shown in FIG. 8, the latch projection 70 and walls of the recess 72 converge upwardly, so latching requires a force fit and so the platform can be lifted only by a firm upward force applied to the platform that deflects opposite sides of the latch projection towards each other. Such upward force is usually applied by lifting the handle 46 (FIG. 3). When the platform plate is latched down by the projection 70 lying in the recess 72, the handle 46 lies in a gap 64. It is possible to hold down a larger part such as a large platform, by providing a plurality of latch projections similar to 70 and forming the bowl bottom wall with a plurality of corresponding recesses similar to 72. In that case, the bowl bottom wall can have a lower surface 82 with a flat raised portion.

FIGS. 5 and 7 show that about half of the diameter of the bottom wall 26 of the bowl is curved so its upper surface 80 is convex and its lower surface 82 is concave. This results in the bottom wall middle which forms the recess 72, being raised, so bottom wall flat outer portions 84 can rest on a flat surface. Another advantage of the curved bottom wall is that it forms the pool walls 90 of pool 24 where liquids concentrate. Such concentration allow a person to dump food off the plate into thick pools of sauces and juices near the periphery of the bowl bottom wall and to spoon liquids in the pool onto food lying on the plate.

Figure 10:
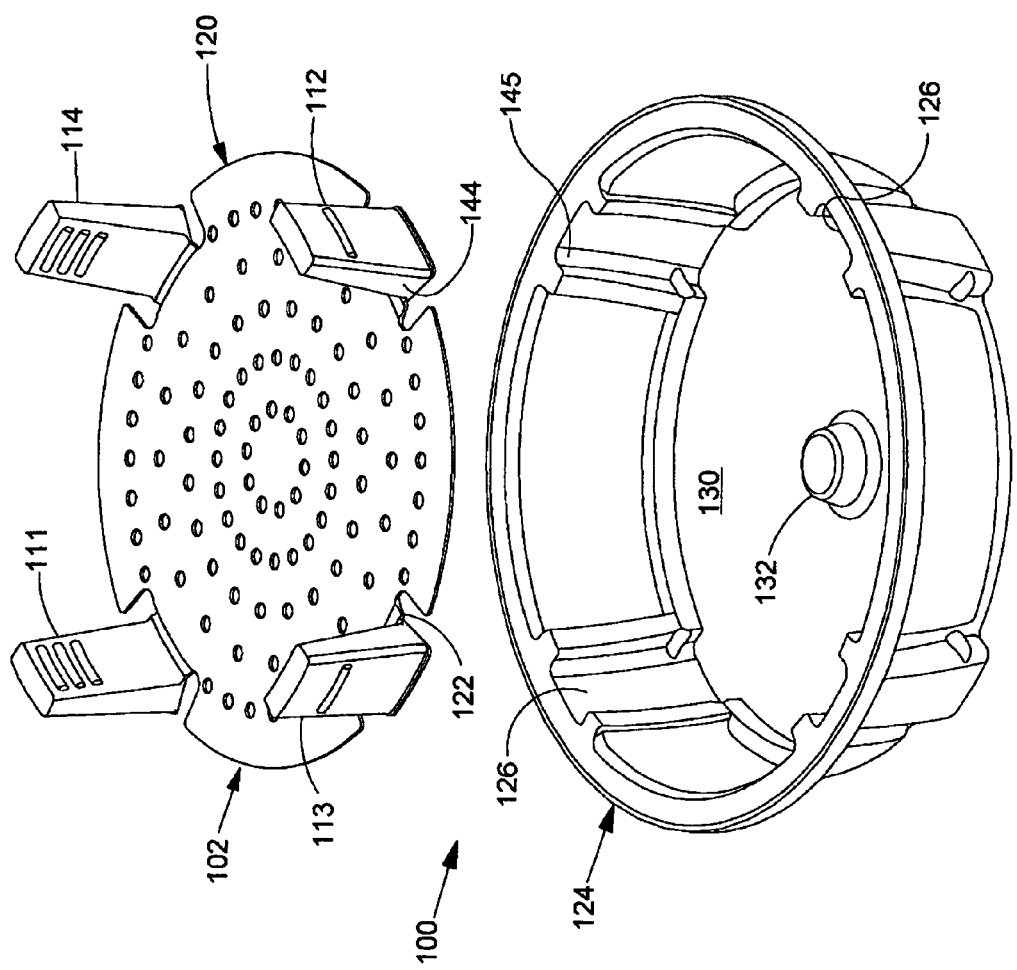
FIG. 10 is an exploded isometric view of a bowl and platform of a bowl assembly of another embodiment of the invention.
Figure 11:
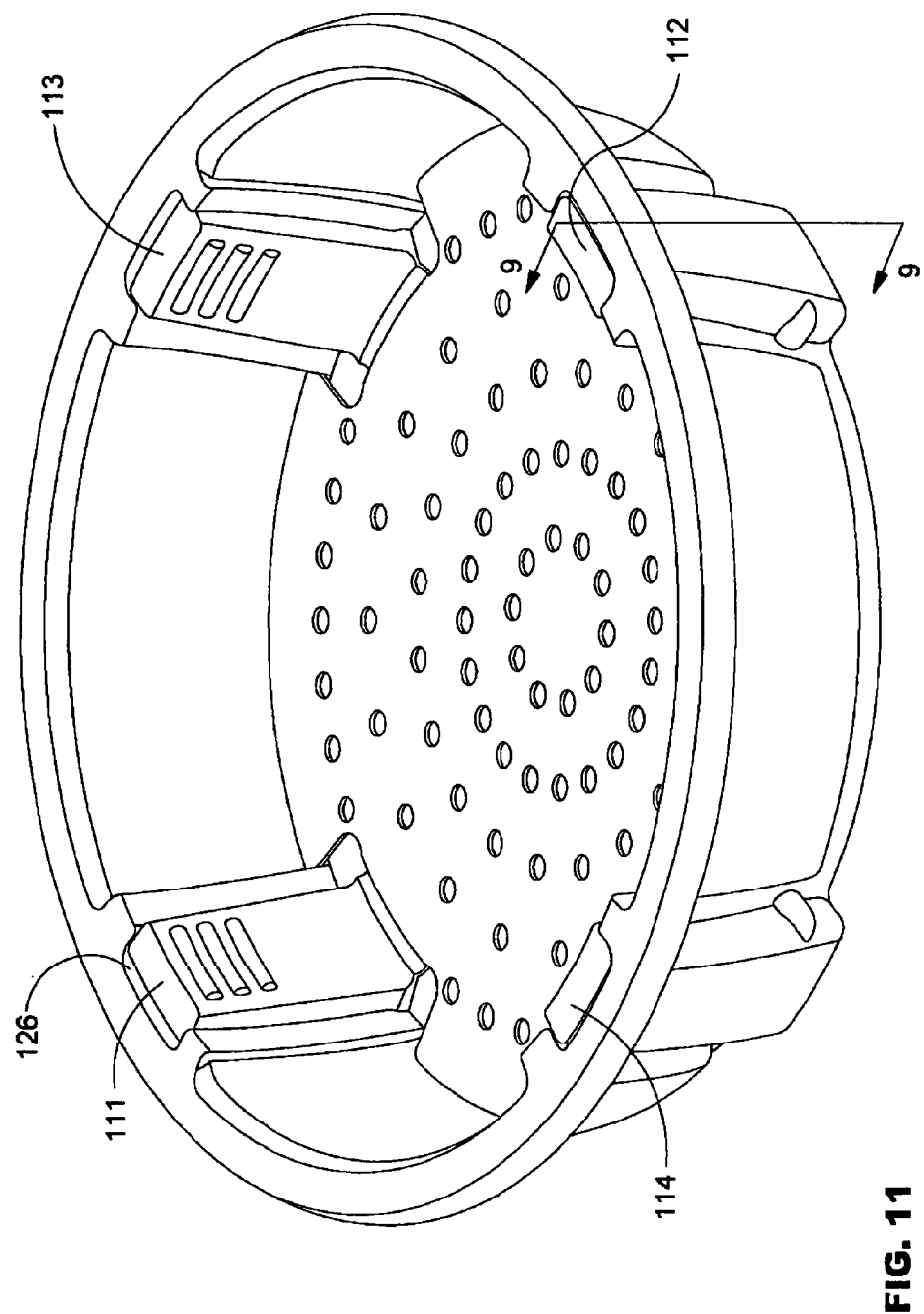
FIG. 11 is an isometric view of the assembled bowl and platform of the bowl assembly of FIG. 10.
Figure 14:
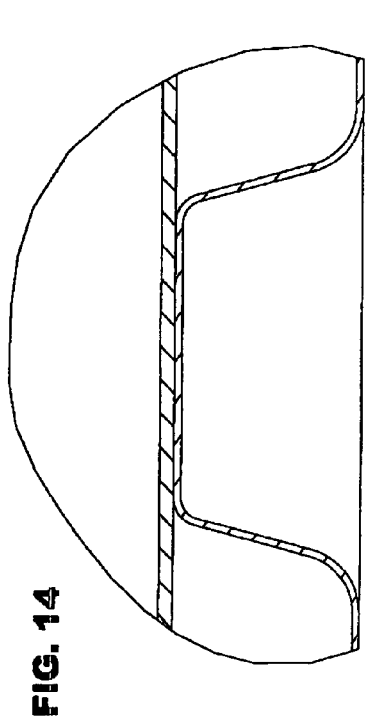
FIG. 14 is an enlarged sectional view of another portion of the assembly of FIG. 12.
Figure 13:
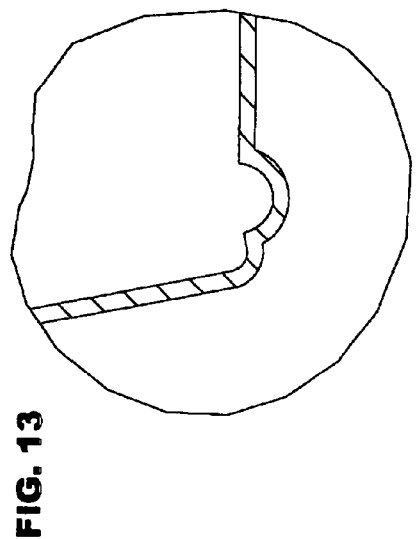
FIG. 13 is an enlarged sectional view of a portion of the assembly of FIG. 12.
Figure 12:
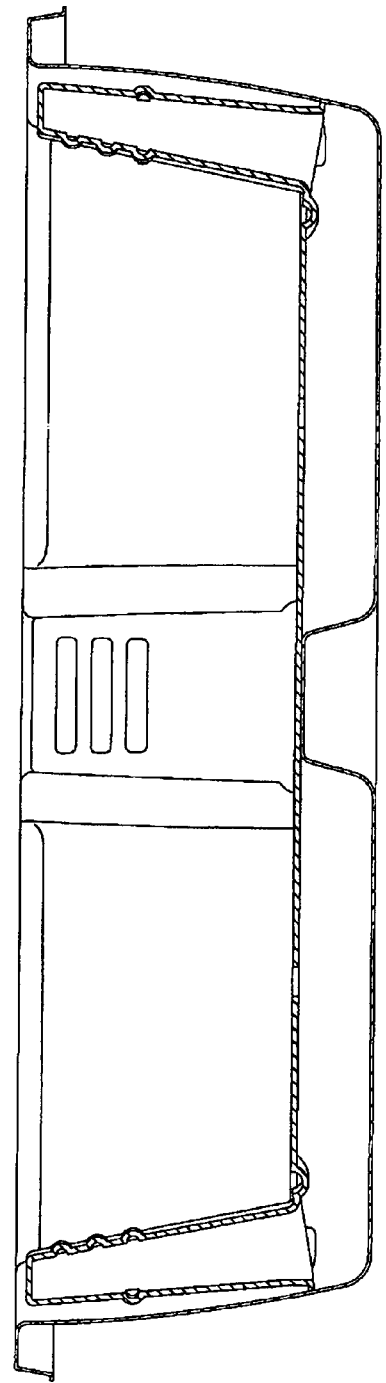
FIG. 12 is a sectional view of the assembled bowl and platform of FIG. 11.

FIG. 10 shows a bowl assembly 100 of another embodiment of the invention, wherein the platform 102 includes two pairs of handles 111-114 that extend primarily upward from the periphery of the platform plate 120. Each of the handles is joined by a hinge joint 122 to the plate 120. The bowl 124 has two pairs of vertically-extending recesses 126 that each receives one of the handles when the platform is fully installed in the bowl. The bowl bottom wall 130 has an upward projection 132 that supports the middle of the platform plate. Each of the handles has opposite walls 144 that snap into a corresponding recess with tapered side walls 145 to fix the platform height. The four handles allow a person to radially inwardly deflect handles to lift and tilt the platform with good control.

Figure 18:
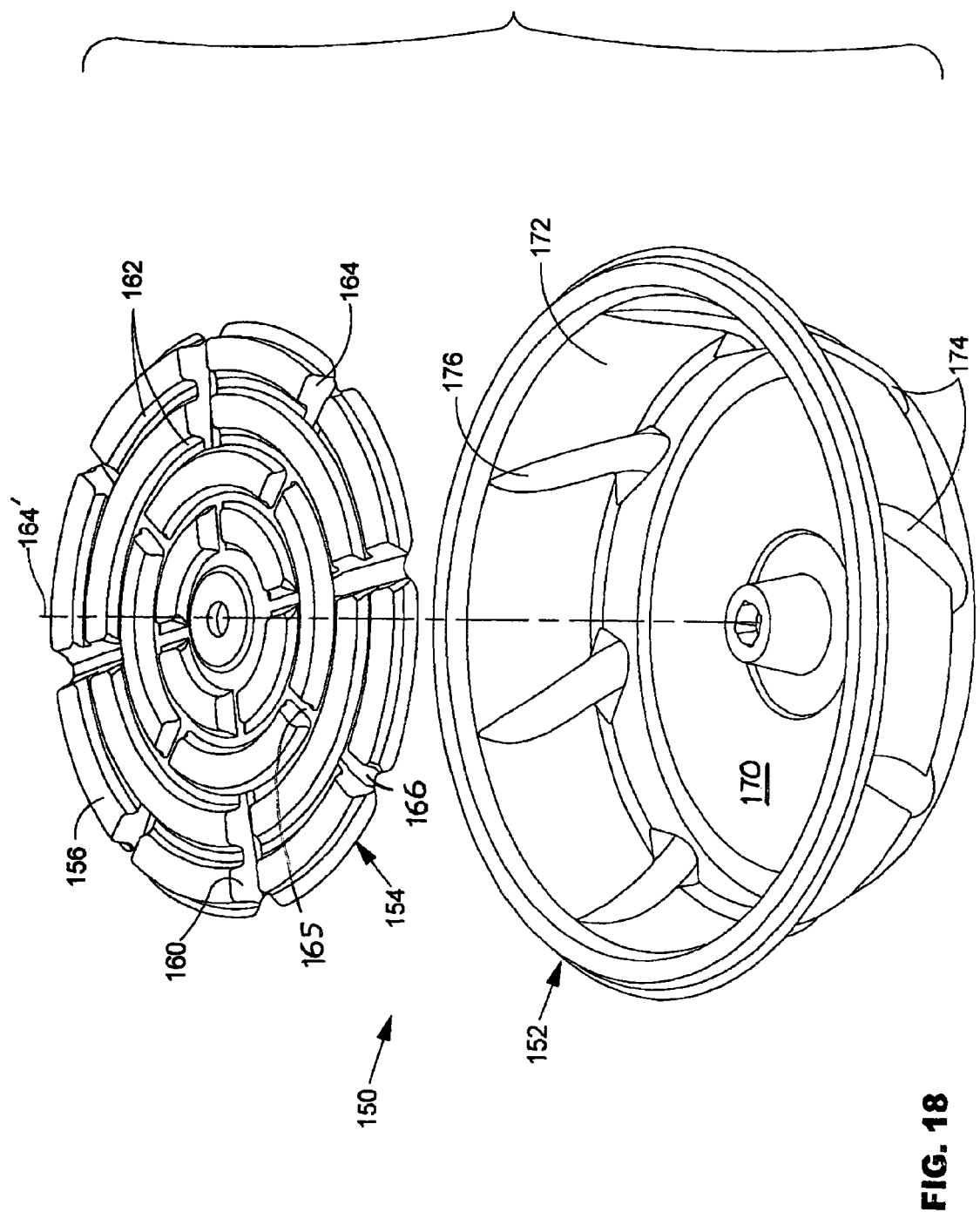
FIG. 18 is an exploded isometric view of a bowl and platform of another embodiment of the invention.
Figures 19, 20:
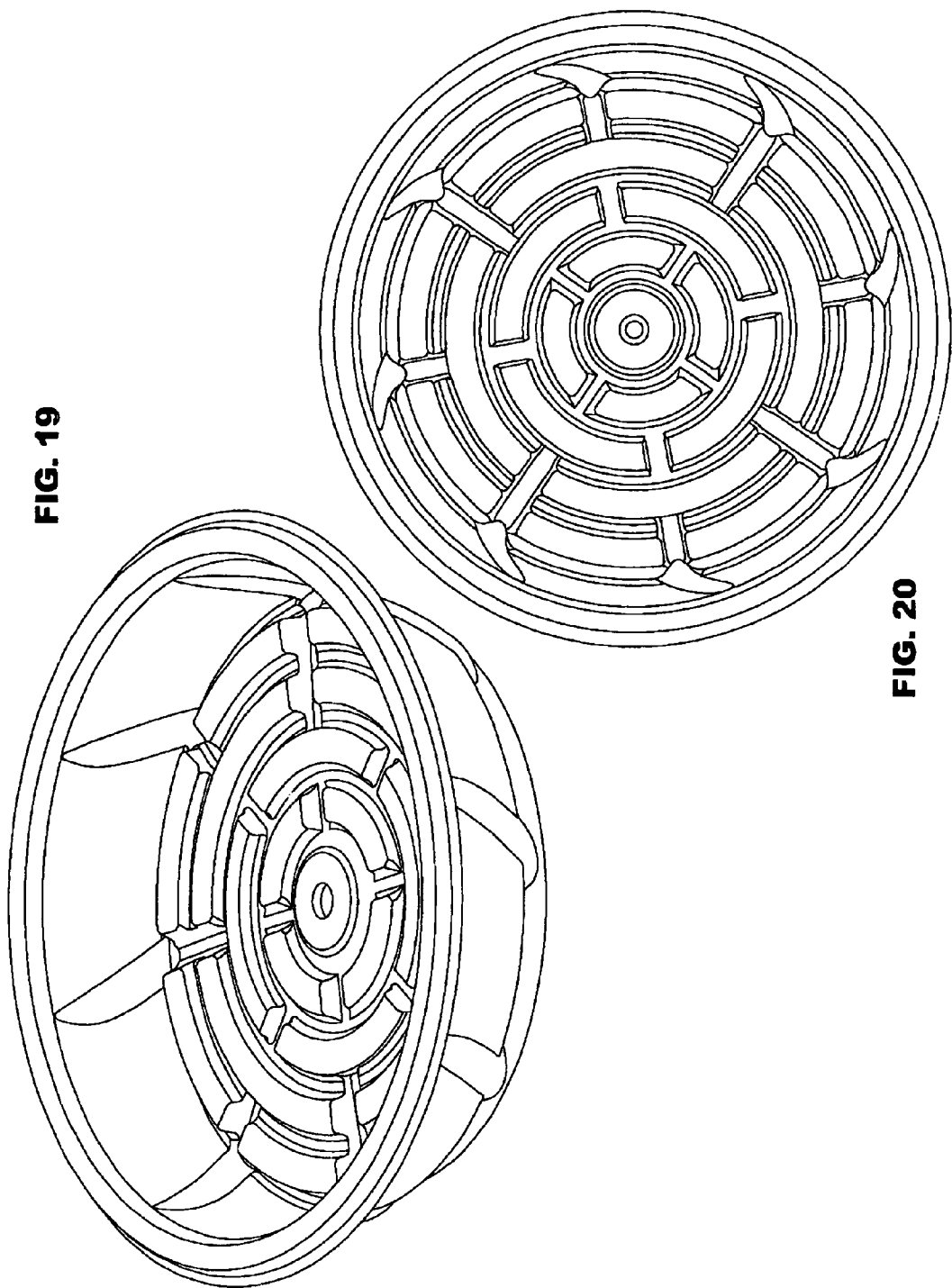
FIG. 19 is an isometric view of the assembled bowl and platform of FIG. 18.
FIG. 20 is a plan view of the assembled bowl and platform of FIG. 19.

FIG. 18 shows a container 150 of another embodiment of the invention, which includes a base 152 and a platform 154 that consists of a plate 156 without an upstanding handle. The lid is not shown. The plate forms numerous channels 160, including four circular channels 162 centered on the axis 164' of the bowl, and radial channels 164 that intersect the circular channels. The radial channels are interrupted by walls of the circular channels. As a result, any fluid that passes between radially inner and outer ends 165, 166 of one of the radial channels, must pass around part of one of the circular channels.

Figure 23:
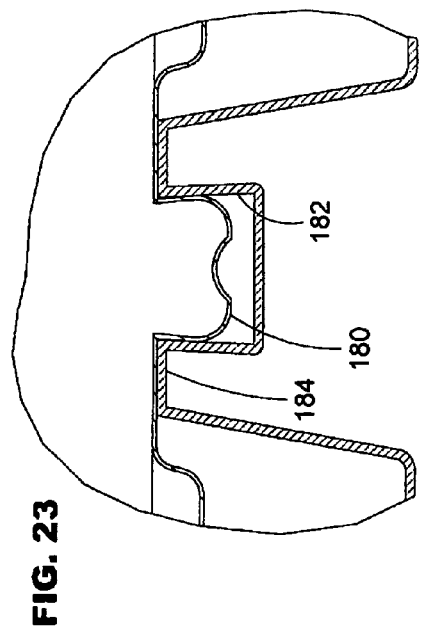
FIG. 23 is an enlarged view of another portion of FIG. 21.
Figure 22:
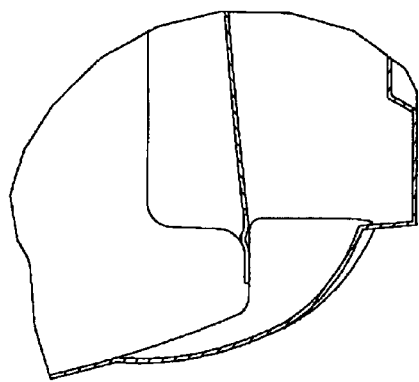
FIG. 22 is an enlarged view of a portion of FIG. 21.
Figure 21:
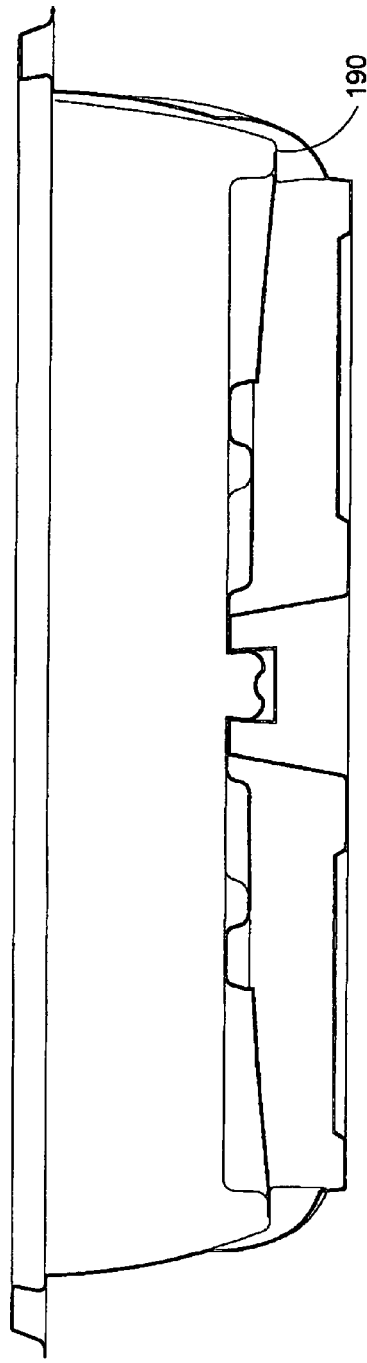
FIG. 21 is a sectional view of the assembled bowl and platform of FIG. 19.

The bowl 152 has a bottom wall 170 and an upstanding peripheral or side wall 172. The side has eight radially outwardly-deformed groove walls 174 that form grooves 176 that extend primarily vertically. The grooves 176 allow steam and vapors to readily circulate between the space beneath and above the plate, and provide a passage for fluids to drop onto the bowl bottom wall. FIG. 23 shows that the plate has a downward projection 180 that snaps into a recess 182 formed on a raised part 184 of the bowl bottom wall. FIG. 21 shows that the periphery of the plate is supported on an interrupted up-step 190 formed in the periphery of the bowl bottom wall between the grooves 174 and interrupted by the largely vertical groove 176.

FIG. 24 shows a bowl assembly with a bowl 200 and platform 202, wherein the platform plate 204 is held at a predetermined height above most of the bowl bottom wall 206 by a latch that is modified from that of FIG. 1. The middle of the bowl, which lies immediately about the vertical axis 210 (the middle can be said to be an area around the axis that is less than 10% of the bowl area as seen in a plan view) has a raised portion 212 with an upward projection or knob 214 that has tapered side walls. The plate 204 has downwardly-depressed regions 221-224 lying close to the axis and forming a correspondingly tapered recess 230. The parts or regions 221-224 are angularly spaced about the axis 210. FIG. 26 shows that the knob, or projection 214 snaps into the interrupted recess 230 to latch the platform in its lowered position.

Thus, the invention provides a bowl assembly for steam cooking food in a microwave oven, of the type that includes a bowl, a lid, and a platform with a plate that supports the food above a bottom wall of the bowl. The plate can be formed with grooves for holding or carrying away sauces and juices from the food to flow to the bottom of the bowl, with possible holes in the bottom of the grooves. The plate can be held down by a vertical projection at the middle of the bowl bottom wall or the middle of the platform, that snaps into a recess formed in the middle of the platform or in the bowl bottom wall. The periphery of the bowl bottom wall forms an interrupted up-step that supports the periphery of the plate, with gaps between up-step parts forming passages though which fluids, steam and vapors can flow. The bowl bottom wall can be formed with a convex upper surface portion that concentrates fluids in a pool at the periphery of the bowl bottom. Although bowls with circular peripheries are shown, the invention relates also to bowls of rectangular, oval and other shapes. The bowl can be sold with food in it, and covered by a transparent film and cover.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A container comprising a base having an axis and having a base bottom wall and upstanding side walls, said container also comprising a platform that includes a plate to lie in said base, all formed of sheets of deformed plastic, wherein
said base bottom wall has a periphery forming an up-step with a plurality of gaps, said plate having a periphery that lies on said up-step, and said gaps form passages through which fluids can flow from on top of said plate, beyond the periphery of the plate, and onto said bottom wall.

2. The container described in claim 1 wherein:
said base bottom wall has radially outward flat portions for supporting said base on a flat surface;
said plate has a middle forming a downward plate projection, and said base bottom wall has a middle with raised walls forming a downward recess that receives and latches to said plate projection.

3. The container described in claim 1 wherein:
said base bottom wall is bent to have a concave lower surface between said raised walls forming a recess and said flat portions for supporting said base.

4. The container described in claim 1 wherein:
said platform forms at least one handle that extends upward from said plate periphery.

5. The container described in claim 1 further comprising a lid to close a top of said base.

6. The container described in claim 1, wherein the upstanding side walls define a circular shape for the base.

7. A container comprising a base having an axis, a bottom wall and upstanding side walls, said container further comprising a platform that forms a plate that fits in said base, wherein
said base bottom wall has a raised portion that forms a first part of at least one latch, and said plate has at least one depressed portion forming a second part of said at least one latch;
one of said parts of said at least one latch being a projection and the other part of said at least one latch being a recess that receives the projection in a force fit.

8. The container described in claim 7 wherein:
said base bottom wall has a middle that lies on said axis and said projection and recess lie on said axis.

9. The container described in claim 7 wherein:
said base bottom wall has a flat portion for resting on a flat surface, and has a convex upper surface portion that extends radially inward from said flat portion to said bottom wall raised portion that forms said recess.

10. The container described in claim 7 wherein:
said plate middle has a flat surface and forms said projection that extends downward, and said raised portion of said base bottom wall middle forms an upwardly open cavity that forms said recess.

11. The container described in claim 7 further comprising a lid to close a top of said base.

12. The container described in claim 7, wherein the upstanding side walls define a circular shape for the base.

13. A container comprising:
a base having a cavity and a central vertical axis, the base having a base bottom, base side walls, and a bottom wall, with a middle of said bottom wall forming an upwardly-opening recess; and
a food platform to separate the volume in the base into upper and lower compartments and to support food above the base bottom, said base and platform each having an interfitting latch part to releasably hold the platform at a predetermined height over the base bottom,
said platform includes a plate and at least one handle that extends upward from said plate, said plate has a middle that forms a downward projection that force fits into said recess, to latch said platform to said base, said handle being graspable to lift said platform and release said platform latch part from said base latch part.

14. The container described in claim 13, wherein:
has a concave lower face and convex upper face, that raise the walls of said recess so a radially outward portion of said base can rest on a flat surface.

15. The container described in claim 13, wherein:
said plate has upper and lower plate surfaces and has a plurality of depressions in said upper surface that extend below said plate lower surface and that form fluid channels for holding fluids.

16. The container described in claim 13, wherein said plate has a periphery, and wherein:
said base has a lower peripheral portion that forms a plurality of angularly spaced upstep with support parts that support the periphery of said plate, said base lower peripheral portion forming gaps between said upsteps where said plate periphery is spaced from said base side walls, so fluid can drain down through said gaps into said base bottom.

17. The container described in claim 16 wherein:
said upstep parts have side walls that extend above said support parts to leave upper portions of said gaps, and said handle lies in one of said gap upper portions.

18. The container described in claim 13, wherein:
said at least one handle includes a plurality of angularly-spaced handles and said base side walls have recesses that receive and latch to said handles.

19. A container comprising:
a base having a base bottom and base side walls, and a food platform to support food above the base bottom,
said base bottom has a periphery forming an upstep with a plurality of gaps to define support parts;
said platform rests on said support parts, said platform having a food support surface and at least one channel in said food support surface with said channel lying below said food support surface, said support parts of said base bottom are horizontally spaced apart, and said platform bridges gaps between said support parts.

20. The container described in claim 19 wherein:
said platform has a plurality of channels, with said channels being connected together.

21. A container comprising a base that has a central vertical axis, a base bottom and base side walls, and a food platform to support food above the base bottom, wherein
said food platform has at least one circular channel wall forming at least one circular channel extending around said axis, said food platform also having a plurality of radial channels that extend radial from said circular channel and that intersect said at least one circular channel,
said radial channels are interrupted by walls of said at least one circular channel so any fluid that passes around part of the at least one circular channel can pass between radially inner and outer ends of one of said radial channels.

* * * * *